Oct. 3, 1961  J. W. NORMANDY  3,002,641
CLOSURE
Filed April 25, 1957

INVENTOR
JOHN W. NORMANDY

BY *Cushman, Darby & Cushman*
ATTORNEYS

United States Patent Office 3,002,641
Patented Oct. 3, 1961

3,002,641
CLOSURE
John W. Normandy, Washington, D.C., assignor to Crown Cork & Seal Company, Inc., Baltimore, Md., a corporation of New York
Filed Apr. 25, 1957, Ser. No. 655,043
8 Claims. (Cl. 215—40)

This invention relates to closures containing liners made from vinyl chloride resin plastisols.

Recently it has been proposed to employ vinyl chloride resin plastisols as cushion sealing liners in crown type closures.

One of the greatest drawbacks to the commercial success of such plastisol lined crowns is the blistering (i.e., separation of the liner from the closure) of the liner upon removal of the closure from the container.

Accordingly it is an object of the instant invention to overcome the problem of blistering normally associated with the use of vinyl chloride plastisol liners for crown closures.

An additional object is to improve the adhesion of plastisol liners to the crown closure shell.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

While the present invention is primarily directed to making caps of the crown type having overall vinyl chloride resin plastisol liners it is also useful in preparing caps of the screw-on, lug or press-on type having liners of vinyl chloride resin plastisols.

It has now been found that the problem of blistering can be substantially eliminated if the percent of plasticizer, based on the total of plasticizer and vinyl chloride resin is reduced from 40% or higher as has been proposed in the art to considerably less than 40%, i.e., to 37% or below and normally between 33% and 37%. The resin is correspondingly between 67% and 63%. Preferably the plasticizer is between 35 and 36% and the resin between 65 and 64%. With such formulations blistering in consistently kept between 0 and 3%. However, with formulations containing 40% or more plasticizer based on the resin-plasticizer, total blistering is usually at least 18% and may be as high as 100%, averaging about 62%.

Normally the lower the amount of plasticizer the shorter the time that the viscosity of the plastisol is maintained stable during dispensing and for this reason there is preferably used at least 33% of plasticizer.

While the preferred plasticizer is dioctyl phthalate other plasticizers can also be employed.

If desired an inert filler, preferably an inorganic mineral filler can also be present in addition to the resin and plasticizer. When a filler is employed it can be used in an amount of from 1 to 25% of the total composition. The use of a filler has the advantage of making the composition cheaper to manufacture but increases the viscosity. For this reason too high an amount of filler is not recommended for best operation. The amount of filler employed does not help or hurt the antiblistering properties of the composition.

In addition to the antiblistering effects noted with the low plasticizer to resin ration in the plastisols of the present invention it has been observed that the lithography conditions for the closure shell become less critical.

The present invention is intended to cover the formation of liners from both foamed and unfoamed liners. The foamed liners are formed by saturating the plastisol with an inert gas, e.g., carbon dioxide, air nitrogen, nitrous oxide, etc., at room temperature, for example, and then the plastisol containing the inert gas placed in the closure shell and heated to expand the foam. The plastisol can be molded with the aid of a forming plunger to form the liner simultaneously with the heating. Alternatively, the inert gas containing plastisol can be spread by spinning (e.g., at 600 to 2000 r.p.m.) and then heated to form the expanded liner.

When foamed liners are formed with the aid of a forming plunger it has been found desirable to take the closure shells containing the foamed liner and place them in an oven, e.g., at 150–200° C. for ½ to 5 minutes in order to further expand the foam. In forming foamed liners the plastisol is preferably saturated with the gas although there can be used as little gas as will only give 10% of complete saturation.

A vinyl chloride plastisol may be described as a mixture of a vinyl chloride resin with a plasticizer in which the resin is essentially insoluble at room temperature, or very slowly soluble at room temperature, but in which it is essentially completely and rapidly soluble at some elevated temperature, or slowly soluble on standing at room temperature. When such a mixture is heated, the resin dissolves in the hot plasticizer and, when the solution cools, a permanent gel is formed. A platstisol has also been defined as a semi-liquid paste composition containing a normally liquid plasticizer and a vinyl chloride resin which is paste forming with the plasticizer at a temperature below the fluxing temperature of the resin-plasticizer components and capable, upon being heated to the fluxing temperature of the resin-plasticizer components, of forming a permanent rubbery gel.

Ae the vinyl chloride resin, there can be used homopolymers, such as Geon 101 (mol. wt. about 82,000); Vinylite QYNV and Geon 121 (mol. wt. about 89,000). There can also be used copolymers of vinyl chloride with a minor amount of copolymerizable ethylenically unsaturated material. Generally, the copolymerizable material is used in an amount of 20% or less, and preferably 10% or less, e.g., 5%. As illustrative copolymerizable materials, there can be used vinyl acetate, vinylidene chloride, acrylonitrile, trichloroethylene, maleic anhydride, diethyl maleate, and other alkyl maleates, etc. Specific examples of copolymers are Vinylite VYNV (copolymer of 95% vinyl chloride-5% vinyl acetate); Exon 654 (vinyl chloride copolymerized with not over 5% trichloroethylene); Pliovic AO (vinyl chloride copolymerized with not over 5% of a dialkyl maleate); Vinylite VYHH (copolymer of 87% vinyl chloride with 13% vinyl acetate); Vinylite VMCH (a copolymer containing 86% vinyl chloride, 13% vinyl acetate and 1% maleic anhydride); Geon 202 (copolymer of 94% vinyl chloride and 6% vinylidene chloride).

The preferred plasticizer is dioctyl phthalate (di-2-ethylhexyl phthalate), although other conventional vinyl chloride plastisol plasticizers can be used, such as other alkyl phthalates, e.g., butyl decyl phthalate, octyl decyl phthalate, diisodecyl phthalate, di-isooctyl phthalate, didecyl phthalate, di-dodecyl phthalate, butyl phthalyl butyl glycolate, ethyl phthalyl ethyl glycolate, methyl phthalyl ethyl glycolate, and other alkyl phthalyl alkyl glycolates, acetyl tributyl citrate, diisobutyl adipate, butyl benzyl phthalate, didecyl azelate, dioctyl azelate, dioctyl adipate, dioctyl sebacate, dibutyl sebacate, and other dialkyl esters of alkane dicarboxylic acids, trioctyl phosphate, tricresyl phosphate and other triaryl phosphates, tetrahydrofurfuryl alcohol esters, e.g., tetrahydrofurfuryl adipate, low viscosity polyesters, e.g., polyethylene glycol adipate, polyethylene glycol adipate-maleate, alkyl esters of higher fatty acids, e.g., pelargonic acid and mixtures of two or more of these plasticizers or one or more primary plasticizers with one or more secondary plasticizers can be used.

Fillers can be added, if desired, e.g., talc, calcium carbonate, clays, e.g., bentonite, calcium silicate, carbon, finely divided silica and diatomaceous earth. Pigments also can be added, if desired, to impart any desired color and for opaqueness.

Preferably, there is present a stabilizer for the vinyl chloride. For each 100 parts of vinyl chloride resin, there are used 1 to 10 parts of stabilizer. Good stabilizers are Thermolite 31 (a thio organic tin compound), Stayrite No. 90 (a mixture of metallic soaps, predominantly calcium, aluminum and zinc stearates, with a minor amount of other fatty acid salts), cadmium laurate, barium laurate, calcium stearate, magnesium stearate, aluminum stearate, zinc stearate, and other fatty acid soaps of these metals, alkyl and aryl tin compounds, dibutyl tin oxide, trioctyl phosphite, cadmium and barium epoxy compounds, diphenyl urea, polyethylene glycol adipate and adipate-maleate, etc.

Throughout the present specification and claims, unless otherwise stated, all proportions and percentages are by weight.

The plastisol liners of the instant invention can be employed with conventional lacquered metal crown caps, such lacquers normally having a vinyl resin base.

A specific example of such a lacquer comprises a mixture of 80% of a vinyl chloride-vinyl acetate copolymer (87% vinyl chloride), together with 20% of an oleoresinous modifier, specifically tung oil modified phenyl phenolformaldehyde resin, dissolved in an organic solvent, specifically 70% xylene and 30% isophorone. The lacquer has 20% solids content. The solvents, of course, are removed after the lacquer is applied to the cap.

Molding pressure is not especially critical and, generally, need only be sufficient to form the liner into the desired shape. Typical molding pressures are from light shaping pressure of one lb./sq. in. or less to 500 lbs./sq. in. As little as 1/10 lb./sq. in. of molding pressure has worked satisfactorily and, such low pressures are preferred, because of simpler operating conditions and the avoidance of undue compression. Much above, such low shaping pressure is generally undesirable. Since outstanding commercial results are obtained at very low pressures, except in rare instances, there is no advantage in using higher pressures.

The molding die, preferably, has a stepped face and can be a plunger of the type conventionally employed in the crown cap art to produce a liner having a central recess and a relatively thicker rim near to but spaced from the skirt wall, so as to provide a greater amount of liner material for engagement with a lip of a bottle to insure an adequate seal while, at the same time, reduce the amount of material required to form the liner. Of course, a conventional plunger can be used without a step to produce a liner without a central recess.

Referring to the drawings.

Figure 1:
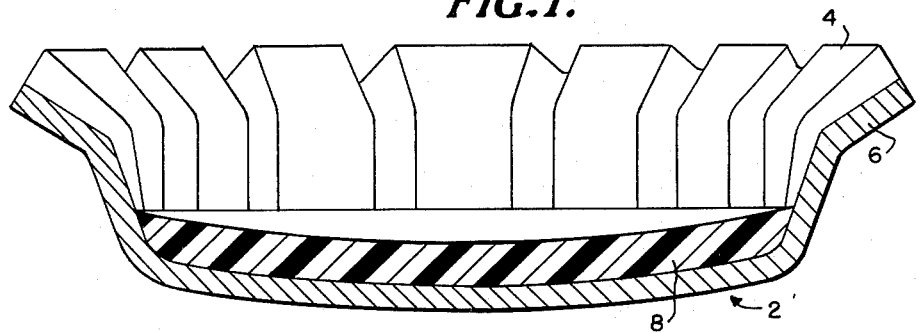
FIGURE 1 is a sectional view of a crown closure cap with a formed plastisol liner.

Referring more specifically to the drawing, the numeral 2 indicates a metal, e.g., tin-plated steel crown shell having a fluted skirt 4 and an overall vinyl resin lacquer coating 6 of the type previously described. Superimposed on the lacquer coating is vinyl chloride plastisol liner 8 which may be of foamed or unfoamed type and made from a plastisol composition consisting of 66 parts vinyl chloride resin and 34 parts dioctyl phthalate.

Figure 2:
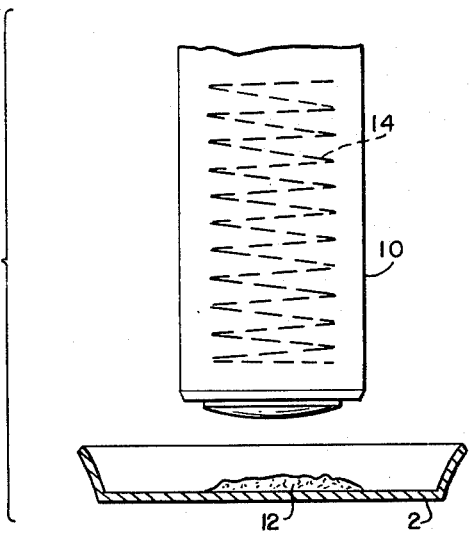
FIGURE 2 shows a stepped die about to be applied to a cap containing a plastisol.

Referring to FIGURE 2, there is shown a stepped die or plunger 10 about to be applied to a crown type cap 2 having a blob of vinyl chloride plastisol 12 in the center thereof. The plunger can be heated as by electrical heating element 14 or by any other conventional heating means.

Figure 3:
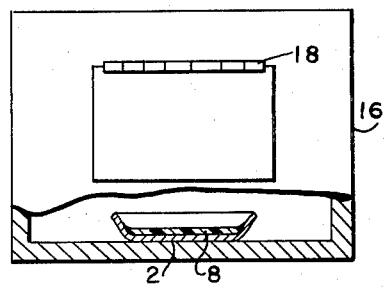
FIGURE 3 is a view of a cap having a foamed liner in an oven.

In FIGURE 3 there is shown the optional feature of a heating oven 16 in which is positioned crown closure 2 having a liner 8 of foamed vinyl chloride plastisol (previously molded to shape with the aid of plunger 10, FIGURE 2). The closure is heated by a source of radiant heat 18 located in the oven in order to complete the expansion of the foamed plastisol.

In a specific example a vinyl chloride resin dioctyl phthalate plastisol having a 2:1 resin to plasticizer ratio was saturated with carbon dioxide at atmospheric pressure, inserted in a crown shell and then molded into a liner with a heated (170° C.) plunger.

Typical formulations of plastisol compositions suitable for use in the present invention are given in Table I below:

Table I

| Component | Amount | | | |
|---|---|---|---|---|
| | A | B | C | D |
| Exon 654 (70 poses) | 46 | 46.3 | 46 | 4 6 |
| Geon 202 | 18.5 | 17.5 | 17 | 17 |
| Dioctyl phthalate (GP-264) | 30.8 | 35.5 | 33 | 36.3 |
| Paraplex G-62 (a polymeric ester-epoxide specifically a glycol-sebacate-epoxide) | 4 | | 4 | |
| Stabilizer: | | | | |
| Dibutyl P-cresol (antioxidant) | 0.2 | 0.2 | 0.2 | 0.2 |
| Titanium dioxide (pigment) | 0.25 | 0.25 | 0.25 | 0.25 |
| Carbon black (pigment) | 0.25 | 0.25 | 0.25 | 0.25 |
| Wollastonite P-1 (calcium silicate) (filler) | | | 15 | 15 |

Unfoamed liners were made from each of compositions A, B, C and D by placing a blob of 0.35 gram of the composition in a conventional metal crown cap having a conventional vinyl chloride-vinyl acetate lacquer as previously set forth. Then a stepped plunger, having a temperature of 170° C. was applied to the cap for seven (7) seconds at a pressure of 0.1 lb./sq. in. (the weight of the plunger) spreading and forming the plastisol to form the liner in each instance. The crowns made with the liners from compositions A, B, C and D were tested with pressure beverages such as Coca Cola, Pepsi Cola, soda water, ginger ale and beer, and in every instance gave satisfactory sealing. Blistering was consistently below 3%, usually approximately 0%. In contrast to the compositions of the present invention, crown caps having liners made from a present commercially proposed vinyl chloride plastisol formulation containing 40 parts dioctyl phthalate (plasticizer) 60 parts vinyl chloride resin and 25 parts silica filler average 62% blistering. This blistering was reduced to less than 3% when the amount of plasticizer was reduced to 36 parts and the amount of resin increased to 64 parts.

When compositions A, B, C and D were saturated with carbon dioxide gas at room temperature and then formed into cap liners by placing 0.35 gram of the carbon dioxide saturated plastisols into the lacquered crown caps followed by application of the stepped die at 170° C. foamed liners were formed having cells of the closed type. The foamed liners proved equally resistant to blistering to the unfoamed liners; in each case blistering was below 3%.

Samples of each of lacquered metal crown caps having liners from foamed compositions A, B, C and D were each placed in an oven after the seven (7) second hot plunger forming and shaping previously described. The caps were allowed to stay in the oven at 170° C. for 30 to 300 seconds. It was noted that the foams continued to expand with a net increase in volume of about 10%. In commercial practice this would permit a reduction in the amount of plastisol required for liner formation. It was also noted that slightly better sealing properties resulted from this subsequent heating although it should be pointed out that this post heating is not an essential step and, in fact, one of the advantages of the present invention is that the liners can be formed on regular assembly machinery since no after curing of the resin is required, contrary to the practice in some of the prior art.

This application is a continuation-in-part of application Serial No. 549,831, filed November 29, 1955.

What is claimed is:

1. A closure shell containing a vinyl chloride resin plastisol liner having not over about 37% plasticizer based on the total of plasticizer and vinyl chloride resin.

2. A closure shell containing a vinyl chloride resin plastisol liner having from 33 to 37% of plasticizer and 67 to 63% of resin based on the total of plasticizer and vinyl chloride resin.

3. A closure shell according to claim 2 having an inert mineral filler present in an amount up to 25% of the composition.

4. A closure shell according to claim 2 wherein the plasticizer is dioctyl phthalate.

5. A closure shell according to claim 2 wherein the liner is unfoamed.

6. A closure shell according to claim 2 wherein the liner is foamed.

7. A closure shell containing a vinyl chloride resin plastisol liner having from 35 to 36% of plasticizer and 65 to 64% of resin based on the total of plasticizer and vinyl chloride resin.

8. A combination of a closure shell and a sealing liner as in claim 7 wherein said plasticizer is dioctyl phthalate.

References Cited in the file of this patent

UNITED STATES PATENTS

| | | |
|---|---|---|
| 2,256,483 | Johnston | Sept. 23, 1941 |
| 2,387,730 | Alderson | Oct. 30, 1945 |
| 2,489,407 | Foye | Nov. 29, 1949 |
| 2,543,775 | Gora | Mar. 6, 1951 |
| 2,654,913 | Maier | Oct. 13, 1953 |
| 2,681,742 | Miller | June 22, 1954 |
| 2,688,776 | Evans et al. | Sept. 14, 1954 |

FOREIGN PATENTS

| | | |
|---|---|---|
| 722,903 | Great Britain | Feb. 2, 1955 |